Patented July 8, 1924.

1,500,193

UNITED STATES PATENT OFFICE.

ROBERT H. HUTCHINSON, OF DALLAS, TEXAS.

LUBRICATING COMPOUND.

No Drawing. Application filed February 21, 1922. Serial No. 538,342.

*To all whom it may concern:*

Be it known that I, ROBERT H. HUTCHINSON, a citizen of the United States, residing at Dallas, in the county of Dallas and State of Texas, have invented certain new and useful Improvements in Lubricating Compounds, of which the following is a specification.

This invention relates to lubricants for motor vehicle engines and is specifically intended for use for the transmission bands of the type of automobile engine, such bands being in the crank case and are for the purpose of moving the gears to transmit power from the crank shaft to the running parts of the automobile. These bands frequently become flinty and "hard" and produce a chattering sound, gripping the parts to which they are connected too quickly, causing a shivering, jerky and shaky motion.

The object of the lubricating compound is to obviate this difficulty by its application to the bands referred to in the crank case and to permit them to grip the parts instantly and smoothly.

The lubricating compound is composed of the following ingredients in about the proportions stated below and which may be varied to some extent. The lubricating compound comprises paraffine one and one-half ounces, alcohol one-half ounce, cylinder oil four ounces, castor bean oil four ounces, castor machine oil four ounces, and neat's-foot oil two ounces. These measurements or quantities when mixed together are sufficient to make one pint of the lubricating compound, but it is of course understood that they may be mixed in larger quantities, following the proportions. The mixture or compound remains in a soft, but rather stiff, heavy state resembling a heavy oil and may be poured into the crank case with the lubricating oil.

What is claimed is—

A compound for softening brake bands of motor vehicles, consisting of cylinder oil, castor bean oil, and castor machine oil, to which is added paraffine and neat's-foot oil, and alcohol as a solvent of the paraffine and castor bean oil, to allow them to mix with the other ingredients when the compound is heated.

In testimony whereof I have signed my name to this specification.

ROBERT H. HUTCHINSON.